(12) United States Patent
Müller-Stach et al.

(10) Patent No.: US 8,252,258 B2
(45) Date of Patent: Aug. 28, 2012

(54) DIESEL OXIDATION CATALYST WITH LAYER STRUCTURE FOR IMPROVED HYDROCARBON CONVERSION

(75) Inventors: Torsten W. Müller-Stach, Hannover (DE); Torsten Neubauer, Langenhagen (DE); Alfred H. Punke, Schwuelper (DE); Gerd Grubert, Hannover (DE); Attilio Siani, Hannover (DE); Corinna Freitag, Hannover (DE)

(73) Assignee: BASF Corporation, Florham Park, NJ (US)

( * ) Notice: Subject to any disclaimer, the term of this patent is extended or adjusted under 35 U.S.C. 154(b) by 338 days.

(21) Appl. No.: 12/686,827

(22) Filed: Jan. 13, 2010

(65) Prior Publication Data

US 2010/0180582 A1 Jul. 22, 2010

Related U.S. Application Data

(60) Provisional application No. 61/145,413, filed on Jan. 16, 2009.

(51) Int. Cl.
*B01D 53/94* (2006.01)
*B01J 23/40* (2006.01)
*B01J 35/00* (2006.01)
*F01N 3/10* (2006.01)

(52) U.S. Cl. ............... 423/213.2; 423/213.5; 423/213.7; 60/299; 502/60; 502/73; 502/324; 502/400; 502/527.12; 502/527.13

(58) Field of Classification Search .............. 60/299; 423/213.2, 213.5, 213.7; 502/60, 73, 324, 502/400, 527.12, 527.13
See application file for complete search history.

(56) References Cited

U.S. PATENT DOCUMENTS

| | | | |
|---|---|---|---|
| 4,329,162 A | 5/1982 | Pitcher, Jr. | |
| 4,335,023 A | 6/1982 | Dettling et al. | |
| 4,929,581 A | 5/1990 | Steinwandel et al. | |
| 4,961,917 A | 10/1990 | Byrne | |
| 5,125,231 A | 6/1992 | Patil et al. | |
| 5,202,299 A | 4/1993 | Symons et al. | |
| 5,407,880 A | 4/1995 | Ikeda et al. | |
| 5,462,907 A | 10/1995 | Farrauto et al. | |
| 5,491,120 A | 2/1996 | Voss et al. | |
| 5,516,497 A | 5/1996 | Speronello et al. | |
| 5,627,124 A | 5/1997 | Farrauto et al. | |
| 5,772,972 A | 6/1998 | Hepburn et al. | |
| 6,047,544 A | 4/2000 | Yamamoto et al. | |
| 6,093,378 A | 7/2000 | Deeba et al. | |
| 6,110,862 A | 8/2000 | Chen et al. | |
| 6,171,556 B1 | 1/2001 | Burk et al. | |

(Continued)

FOREIGN PATENT DOCUMENTS

EA 0782880 B1 10/2005

(Continued)

*Primary Examiner* — Timothy Vanoy
(74) *Attorney, Agent, or Firm* — Melanie L. Brown; Karen M. Whitney; Diehl Servilla LLC

(57) ABSTRACT

Provided is a diesel oxidation catalyst for the treatment of exhaust gas emissions from a diesel engine and a method for treating a diesel exhaust gas stream, the method comprising providing a diesel oxidation catalyst and contacting said diesel exhaust gas stream with said diesel oxidation catalyst for the treatment of exhaust gas emissions. More particularly, the present invention is directed to a catalyst structure comprising three distinct layers; in which layer comprises a precious metal component such as palladium is located between two hydrocarbon storage layers comprising a molecular sieve such as a zeolite.

15 Claims, 1 Drawing Sheet

U.S. PATENT DOCUMENTS

| | | |
|---|---|---|
| 6,274,107 B1 | 8/2001 | Yavuz et al. |
| 6,444,610 B1 | 9/2002 | Yamamoto |
| 6,471,924 B1 | 10/2002 | Feeley et al. |
| 6,667,018 B2 | 12/2003 | Noda et al. |
| 6,677,264 B1 | 1/2004 | Klein et al. |
| 6,708,484 B2 | 3/2004 | Onodera et al. |
| 7,189,376 B2 | 3/2007 | Kumar et al. |
| 7,246,488 B2 | 7/2007 | Takaya et al. |
| 7,250,385 B1 | 7/2007 | Ohno et al. |
| 2003/0061860 A1 | 4/2003 | Hu et al. |
| 2007/0191219 A1 | 8/2007 | Fujita et al. |
| 2008/0045405 A1 | 2/2008 | Beutel et al. |
| 2008/0219906 A1 | 9/2008 | Chen et al. |
| 2008/0226545 A1* | 9/2008 | Bull et al. ............. 423/700 |

FOREIGN PATENT DOCUMENTS

WO  WO-2008/042084 A1  4/2008

* cited by examiner

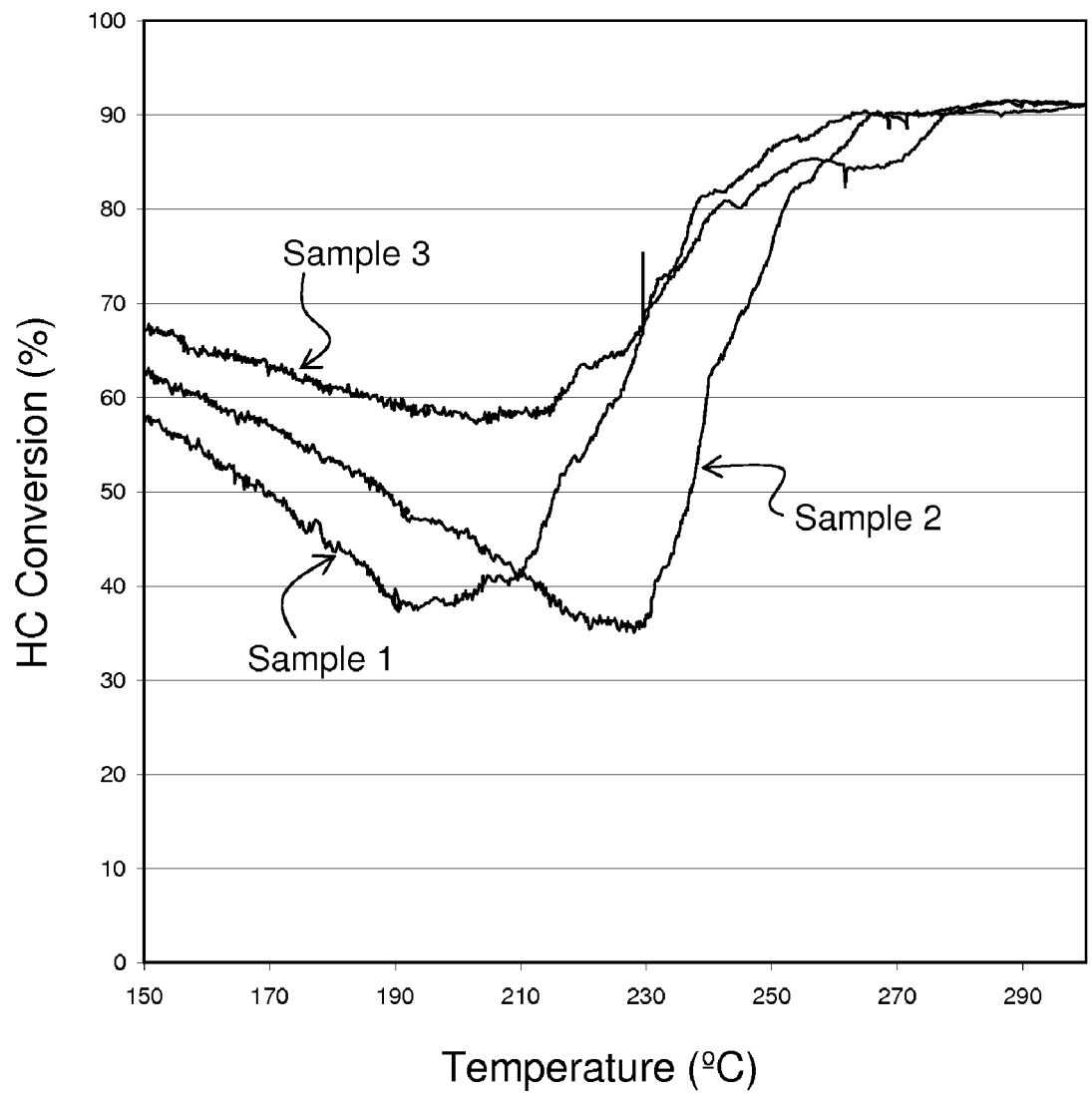

DIESEL OXIDATION CATALYST WITH LAYER STRUCTURE FOR IMPROVED HYDROCARBON CONVERSION

CROSS-REFERENCE TO RELATED APPLICATIONS

This application claims the benefit of priority under 35 U.S.C. §119(e) to U.S. Provisional Application Ser. No. 61/145,413, filed Jan. 16, 2009, which is incorporated herein by reference.

TECHNICAL FIELD

This is directed to a layered diesel oxidation catalyst composite for the treatment of exhaust gas emissions from a diesel engine and a method for treating a diesel exhaust gas stream. More particularly, the present invention is directed to a catalyst structure comprising three distinct layers; in which a catalytically active precious metal component-containing layer, for example, one containing palladium, is located between two hydrocarbon storage layers that contain, for example, one or more zeolites.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising precious metals such as platinum group metals (PGM) dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel powered engine to treat the exhaust before it vents to the atmosphere. Typically, the diesel oxidation catalysts are formed on ceramic or metallic substrate carriers upon which one or more catalyst coating compositions are deposited. In addition to the conversions of gaseous HC, CO and the SOF fraction of particulate matter, oxidation catalysts that contain platinum group metals (which are typically dispersed on a refractory metal oxide support) promote the oxidation of nitric oxide (NO) to $NO_2$.

For example U.S. Pat. No. 5,491,120 discloses oxidation catalysts containing ceria and a bulk second metal oxide which may be one or more of titania, zirconia, ceria-zirconia, silica, alumina-silica and alpha-alumina.

U.S. Pat. No. 5,627,124 discloses oxidation catalysts containing ceria and alumina. It is disclosed that each have a surface area of at least about 10 m²/g. The weight ratio of ceria to alumina is disclosed to be 1.5:1 to 1:1.5. It is further disclosed to optionally include platinum. The alumina is disclosed to preferably be activated alumina. U.S. Pat. No. 5,491,120 discloses oxidation catalysts containing ceria and a bulk second metal oxide, which may be one or more of titania, zirconia, ceria-zirconia, silica, alumina-silica and alpha-alumina.

The prior art also shows an awareness of the use of zeolites, including metal-doped zeolites, to treat diesel exhaust. US 2008/045405 discloses a diesel oxidation catalyst for the treatment of exhaust gas emissions, such as the oxidation of unburned hydrocarbons, and carbon monoxide and the reduction of nitrogen oxides. More particularly, US 2008/045405 is directed to a washcoat composition comprising two distinct washcoat layers containing two distinctly different weight ratios of Pt:Pd.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, see for example U.S. Pat. No. 5,125,231 which discloses the use of platinum group metal-doped zeolites as low temperature hydrocarbon adsorbents as well as oxidation catalysts.

As discussed hereinabove, oxidation catalysts comprising a platinum group metal (PGM) dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, one of the major advantages of using palladium (Pd) based catalysts is the lower cost of Pd compared to Pt. However, Pd based DOCs typically show higher light-off temperatures for oxidation of CO and HC, especially when used with HC storage materials, potentially causing a delay in HC and or CO light-off. However to maximize the amount of hydrocarbons that is absorbed during the cold start phase of an engine it is desirable to increase the hydrocarbon storage capacity. Moreover the increase of hydrocarbon storage capacity prevents the coverage of precious metal absorption sites thus increasing the amount of catalytically active sites that are available for CO absorption and conversion. This mechanism leads to an improved carbon monoxide conversion in addition to a better hydrocarbon conversion.

As emissions regulations become more stringent, there is a continuing goal to develop diesel oxidation catalyst (DOC) systems that provide improved performance, for example, light-off performance. Consequently the present invention is directed to a diesel oxidation catalyst with a layer design in order to maximize the hydrocarbon storage capacity without sacrificing the catalytic activity of the catalyst. There is also a goal to utilize components of DOCs, for example, the zeolites and palladium, as efficiently as possible.

SUMMARY

Provided are exhaust systems and components and methods of using the same that use a diesel oxidation catalytic material on a support. The support can be a flow-through design used for a diesel oxidation catalyst (DOC) or wall-flow design used for a catalyzed soot filter (CSF). The present invention relates to a layered diesel oxidation catalyst composite for the treatment of exhaust gas emissions from a diesel engine comprising: a carrier substrate; a bottom layer coated on said carrier substrate comprising at least one first molecular sieve; a middle layer coated over said bottom layer comprising at least one precious metal component on a refractory metal oxide support; and a top layer coated over said middle layer comprising at least one second molecular sieve.

Another aspect provides a method of treating a gaseous exhaust stream of a diesel engine, the exhaust stream including hydrocarbons, carbon monoxide, and other exhaust gas components, the method comprising: contacting the exhaust stream with the layered diesel oxidation catalyst composites according to embodiments of the present invention. Other methods can further include directing the diesel exhaust gas stream one or more to a soot filter located downstream of the diesel oxidation catalyst composite and a selective catalytic reduction (SCR) catalytic article located upstream or downstream of the catalyzed soot filter (CSF).

A further aspect provides a system for treatment of a diesel engine exhaust stream including hydrocarbons, carbon monoxide, and other exhaust gas components, the emission treatment system comprising: an exhaust conduit in fluid communication with the diesel engine via an exhaust manifold; the diesel oxidation catalyst composite according to embodiments of the present invention wherein the carrier is a flow through substrate or a wall-flow substrate; and one or more of the following in fluid communication with the composite: a soot filter, a selective catalytic reduction (SCR) catalytic article and a NOx storage and reduction (NSR) catalytic article.

In one or more embodiments, the diesel oxidation catalytic material has a middle layer of the catalyst which is substantially free of a molecular sieve.

BRIEF DESCRIPTION OF DRAWINGS

FIG. 1 provides a graph of hydrocarbon conversion data.

DETAILED DESCRIPTION

Specifically provided are diesel exhaust systems and components where the zeolite is located in layers on both sides of a layer containing a precious metal component such as palladium. Therefore, the bottom and top layer of the diesel oxidation catalyst of the present invention comprises a microporous material which can act as a hydrocarbon (HC) storage component, e.g., a zeolite, in order to store HCs during the cold start period of the drive cycle. After warm-up of the catalyst, the hydrocarbon (HC) storage component will release the stored HCs which are subsequently converted over the catalyst.

The diesel oxidation catalyst according to the present invention comprises at least three separate layers on a carrier substrate, wherein the bottom and the top layer comprise at least one microporous material and the middle layer comprises at least one catalytically active PGM component. The bottom and the top layers have a high hydrocarbon storage capacity and due to the separation of the layers, the middle layer has high conversion efficiency without negative interference between at least one catalytically active PGM component and at least one microporous material. The diesel oxidation catalysts according to the present invention have an improved hydrocarbon conversion.

The diesel oxidation catalyst according to the present invention can also comprise further layers. These layers can be arranged in any order and can also be intermediate layers between any of the layers or the carrier substrate disclosed above. According to the present invention additional layers may comprise any suitable material, for example a porous material, e.g. a base metal oxide and transition metal oxide, or a microporous material.

Preferably, the middle layer of the diesel oxidation catalyst according to the present invention is substantially free of a microporous material.

Reference to a catalyst composite means a catalytic article including a carrier substrate, for example a honeycomb substrate, having one or more washcoat layers containing a catalytic component, for example, a precious group metal component that is effective to catalyze the oxidation of HC, CO and/or $NO_x$.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%). As used herein, therefore, a "layer substantially free of a microporous material" is a layer containing no more than 10 wt % of a microporous material or is completely free of a microporous material. However, according to the present invention the term "layer substantially free of a microporous material" does not exclude that the porous material which may be present in a layer being macro- or meso-porous contains a small amount of microporous material.

High surface refractory metal oxide supports, also called macroporous materials herein, refer to support particles having pores larger than 20 Å and a wide pore distribution. As defined herein, such metal oxide supports exclude molecular sieves, specifically, zeolites. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2$ g. The loading on the refractory oxide support is preferably from about 0.1 to about 6 $g/in^3$, more preferably from about 2 to about 5 $g/in^3$ and most preferably from about 3 to about 4 $g/in^3$.

As used herein, microporous materials and molecular sieves (used interchangeably), such as zeolites, refer to materials, which may in particulate form support catalytic precious group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

According to a further embodiment, the present invention is directed to the diesel oxidation catalyst for the treatment of exhaust gas emissions from a diesel engine as disclosed above, wherein the middle layer of the catalyst is substantially free of a microporous material.

The diesel oxidation catalyst of the present invention comprises a carrier substrate. In principle, any suitable carrier substrate known to the person skilled in the art can be used in the context of the present invention.

According to the present invention, the oxidation catalyst composition of the present invention is disposed on a carrier substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

For a catalyzed soot filter, the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

A suitable ceramic substrate may be made of any suitable refractory material, e.g., cordierite, cordierite-alumina, silicon nitride, silicon carbide, zircon mullite, spodumene, alumina-silica magnesia, zircon silicate, sillimanite, magnesium silicates, zircon, petalite, alumina, aluminosilicates and the like.

The carrier substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10 to 25 wt % of chromium, 3 to 8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

The middle layer of the diesel oxidation catalyst of the present invention comprises at least one catalytically active component. In principle, any suitable catalytically active component can be used. Preferably, the catalytically active component is at least one metal of the platinum group metals, e.g. at least one metal selected from Pt, Pd, Rh, Au, and/or Ir. In the context of the present invention, it is also possible that the catalytically active component comprises two or more metals of the platinum group metals, in particular Pd and Pt.

Therefore, according to a further embodiment, the present invention is directed to the diesel oxidation catalyst for the treatment of exhaust gas emissions from a diesel engine as disclosed above, wherein the catalytically active component is at least one metal of the platinum group metals.

According to a further embodiment, the present invention is directed to the diesel oxidation catalyst for the treatment of exhaust gas emissions from a diesel engine as disclosed above, wherein the catalytically active component is at least one metal selected from Pt, Pd, Rh, Au, and Ir.

According to another embodiment, the present invention is directed to the diesel oxidation catalyst for the treatment of exhaust gas emissions from a diesel engine as disclosed above, wherein the catalytically active component contains Pt and Pd.

Suitable amounts of Pt and Pd range from 1 to 300 g/ft$^3$. Preferred are values between about 10 to about 220 g/ft$^3$. The ratio between Pt and Pd on a weight basis, range preferably between about 10/1 to about 1/10. Preferred values are between about 4/1 and about 1/2.

It is possible that the catalytically active component is used as such. However, it is also possible, that the middle layer additionally comprises a macroporous support material. In particular it is possible according to the present invention that the middle layer comprises the catalytically active component dispersed on a macroporous support material.

Thus, according to a further embodiment, the present invention is directed to the diesel oxidation catalyst for the treatment of exhaust gas emissions from a diesel engine as disclosed above, wherein the middle layer additionally comprises a macroporous support material.

Suitable macroporous support materials are known to the person skilled in the art. The macroporous support material of the middle layer is preferably a base metal oxide and/or transition metal oxide which are selected from the group including compounds of silica, alumina, zirconia, titania and mixtures thereof. Particularly preferred supports are activated, high-surface area compounds selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, zirconia-titania. In particular preferred are $Al_2O_3$, $ZrO_2$, $CeO_2$ or $SiO_2$ as well as mixtures thereof.

Preferably, the macroporous support material is a material with a porosity between 0.2 to 1.2 mL/g, preferable between about 0.6 and about 1.0 m L/g. The porous support material preferably has a BET surface area between 30 and 300 $m^2/g$, more preferably between about 60 and about 200 $m^2/g$ and the average pore diameter is in the range of 70 Å to 150 Å.

According to a further embodiment, the present invention is therefore directed to the diesel oxidation catalyst for the treatment of exhaust gas emissions from a diesel engine as disclosed above, wherein the middle layer additionally comprises a macroporous support material selected from base metal oxides and transition metal oxides.

The middle layer of the diesel oxidation catalyst of the present invention can additionally comprise further components, for example further catalytically active components or promoters. Suitable promoters are known to the person skilled in the art. Preferred promoters are for example alkaline oxides such as BaO, MgO, $La_2O_3$ or mixtures thereof. The middle layer, however, is substantially free of base metals in quantities suitable for NOx (nitrogen oxides) storage; such base metals which can include, but are not limited to, Ba, Mg, K, and La, and the like.

According to a further embodiment, the present invention thus is directed to the diesel oxidation catalyst for the treatment of exhaust gas emissions from a diesel engine as disclosed above, wherein the middle layer additionally comprises an alkaline oxide in an amount not suitable for NOx storage.

The bottom layer and the top layer of the diesel oxidation catalyst of the present invention comprise at least one microporous material. According to the present invention, the microporous material is suitable to absorb hydrocarbons, i.e. it can act as hydrocarbon (HC) storage component for the adsorption of hydrocarbons (HC).

In principle, any microporous material can be used for the diesel oxidation catalysts of the present invention. In particular, the microporous material has a pore size between 0.3 to 1.0 nm, preferable between about 0.5 and about 0.8 nm.

According to a further embodiment, the present invention therefore is directed to the diesel oxidation catalyst for the treatment of exhaust gas emissions from a diesel engine as disclosed above, wherein the microporous material of the bottom layer or the microporous material of the top layer or the microporous material of the bottom layer and the top layer has a pore size from 0.3 to 1.0 nm.

Typically, any known a microporous material such as a zeolite or zeolite-like material can be used. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO5 zeolite, offretite, or a beta zeolite. Preferred zeolite adsorbent materials have a high silica to alumina ratio. The zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. Preferred zeolites include ZSM, Y and beta zeolites. A particularly preferred adsorbent may comprise a beta zeolite of the type disclosed in U.S. Pat. No. 6,171,556. The zeolite loading should not be smaller than 0.1 $g/in^3$ in order to guarantee sufficient HC storage capacity and to prevent a premature release of stored paraffins during the temperature ramp following low temperature storage. Preferably, zeolite content is in the range of about 0.4 to about 0.7 $g/in^3$. A premature release of aromatics and paraffins from the zeolite may cause a delay in the CO and HC light-off.

In one embodiment, the one or more zeolites may be stabilized by ion exchange with a rare earth metal. In another embodiment, the washcoat layer(s) of the present invention may include one or more rare earth oxides (e.g., ceria) to promote the oxidation of heavy HCs.

According to a further embodiment, the present invention is therefore directed to the diesel oxidation catalyst for the treatment of exhaust gas emissions from a diesel engine as disclosed above, wherein the microporous material of the bottom layer or the microporous material of the top layer or the microporous material of the bottom layer and the top layer is a zeolite.

The bottom layer or the top layer or the bottom layer and the top layer of the diesel oxidation catalyst of the present invention may additionally comprise further components. According to the present invention, it is possible that the bottom layer or the top layer or the bottom layer and the top layer of the diesel oxidation catalyst additionally comprise a catalytically active PGM component or a macroporous support material. Suitable materials are disclosed above.

Thus, according to a further embodiment, the present invention is directed to the diesel oxidation catalyst for the treatment of exhaust gas emissions from a diesel engine as disclosed above, wherein the bottom layer or the top layer or the bottom layer and the top layer additionally comprises a macroporous support material selected from base metal oxides and transition metal oxides.

Typically, the bottom layer or the top layer or the bottom layer and the top layer of the diesel oxidation catalyst comprise a catalytically active PGM component only in an amount which is smaller then the amount in which the middle layer comprises a catalytically active PGM component.

The top layer or the bottom layer may or may not contain a catalytically active PGM component, in particular Pt and or Pd. In the case that Pt is present in either coat, suitable ranges are between 1 to 50 $g/ft^3$, preferred values are between about 2 to about 15 $g/ft^3$. In the case Pd is present suitable ranges are between 1 and 30 $g/ft^3$ preferably between about 2 to about 15 $g/ft^3$.

According to a further embodiment, the present invention is directed to the diesel oxidation catalyst for the treatment of exhaust gas emissions from a diesel engine as disclosed above, wherein the bottom layer or the top layer or the bottom layer and the top layer additionally comprises a catalytically active PGM component.

According to a preferred embodiment, the bottom layer or the top layer or the bottom layer and the top layer of the diesel oxidation catalyst additionally comprise a catalytically active PGM component selected from Pt and Pd, in particular Pd and/or a macroporous support material, in particular alumina.

The diesel oxidation catalysts of the present invention can be prepared by any suitable method.

The composition of each layer of the oxidation catalyst of the present invention can be applied to the substrate surfaces by any known means in the art. For example, the catalyst composition can be applied by spray coating, powder coating, or brushing or dipping a surface into the catalyst composition.

In particular, the individual layers can be applied by any suitable method and after one layer has been applied, preferably a drying step or a drying and a calcination step are applied before the next layer is applied.

According to the present invention, each layer can be applied on the substrate or a layer below completely or in form of a zone covering the substrate or layer below in an amount of about 10 to 100% of the length of the substrate or layer below. The remaining uncovered part of the substrate or layer can be covered with another layer as disclosed above. For the uses as diesel oxidation catalyst, such a zone covers preferably 50 to 100% of the length of the substrate or layer below, more preferably 90 to 100%, for example 100%.

The present invention is also directed to a method for treating diesel engine exhaust gas stream emissions containing unburned hydrocarbons (HC) and carbon monoxides (CO). An exhaust gas stream from a diesel engine can be treated in an emission treatment device containing the diesel oxidation catalyst of the present invention. In accordance with the present invention, the exhaust gas stream first comes into contact with the top layer and subsequently comes into contact with the middle and bottom layer.

During operation, exhaust gaseous emissions from a lean burn engine comprising hydrocarbons, carbon monoxide, nitrogen oxides, and sulfur oxides initially encounter the top layer, and thereafter encounter the middle and bottom layer.

During operation, exhaust gases flow through the diesel oxidation catalyst from the upstream edge to the down stream edge. The catalytically active components contained in the layers oxidize HC and CO pollutants contained in the exhaust gases.

Suitable embodiments of the diesel oxidation catalyst for the method of the present invention are disclosed above.

According to one embodiment, the present invention is directed to the method for treating a diesel exhaust gas stream as disclosed above, wherein the middle layer of the diesel oxidation catalyst is substantially free of a microporous material.

The diesel oxidation catalyst (DOC) of the present invention can be used in an integrated emission treatment system comprising one or more additional components for the treatment of diesel exhaust gas emissions. For example, the emission treatment system may further comprise a soot filter component and/or a selective catalytic reduction (SCR) component. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but is preferably located downstream from the diesel oxidation catalyst. In a preferred embodiment, the soot filter is a catalyzed soot filter (CSF). Any suitable CSF can be used according to the present invention. Preferably, the CSF of the present invention comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Preferred wall flow filter substrates are composed of ceramic-like materials such as cordierite, alpha-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite, silicon carbide and aluminum titanate. Such materials are able to withstand the environment, particularly high temperatures, encountered in treating the exhaust streams.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. Suitable wall flow substrates are for example disclosed in U.S. Pat. No. 4,329,162.

The porous wall flow filter used according to the present invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or within the wall itself may consist all, or in part, of the catalytic material. In another embodiment, this invention may include the use of one or more washcoat layers of catalytic materials and combinations of one or more layers of catalytic materials on the inlet and/or outlet walls of the element.

The exhaust gas treatment system of the present invention may further comprise a selective catalytic reduction (SCR) component. The SCR component should be located downstream of the DOC and may be located upstream or downstream of the soot filter. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 and U.S. Pat. No. 5,516,497. Suitable compositions include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

In embodiment 1, provided is a diesel oxidation catalyst for the treatment of exhaust gas emissions from a diesel engine comprising: (a) a carrier substrate; (b) a bottom layer coated on said carrier substrate comprising at least one microporous material; (c) a middle layer coated over said bottom layer comprising at least one catalytically active component; (d) a top layer coated over said middle layer comprising at least one microporous material.

In the following, preferred designs for the layered catalyst are provided, including such combinations as recited used alone or in unlimited combinations, the uses for which include systems and methods of other aspects of the present invention.

2. The diesel oxidation catalyst of embodiment 1, wherein the middle layer is substantially free of a microporous material.

3. The diesel oxidation catalyst of embodiments 1 to 2, wherein the catalytically active component is at least one metal of the platinum group metals.

4. The diesel oxidation catalyst of any of embodiments 1 to 3, wherein the catalytically active component is at least one metal selected from Pt, Pd, Rh, Au, and Ir.

5. The diesel oxidation catalyst of any of embodiments 1 to 4, wherein the catalytically active component contains Pt and Pd.

6. The diesel oxidation catalyst of any of embodiments 1 to 5, wherein the middle layer additionally comprises a macroporous support material.

7. The diesel oxidation catalyst of any of embodiments 1 to 6, wherein the middle layer additionally comprises a macroporous support material selected from base metal oxides and transition metal oxides.

8. The diesel oxidation catalyst of any of embodiments 1 to 7, wherein the middle layer additionally comprises an alkaline oxide.

9. The diesel oxidation catalyst of any of embodiments 1 to 8, wherein the microporous material of the bottom layer or the microporous material of the top layer or the microporous material of the bottom layer and the top layer has a pore size from 0.3 to 1.0 nm.

10. The diesel oxidation catalyst of any of embodiments 1 to 9, wherein the microporous material of the bottom layer or the microporous material of the top layer or the microporous material of the bottom layer and the top layer is a zeolite.

11. The diesel oxidation catalyst of any of embodiments 1 to 10, wherein the bottom layer or the top layer or the bottom layer and the top layer additionally comprises a macroporous support material selected from base metal oxides and transition metal oxides.

12. The diesel oxidation catalyst of any of embodiments 1 to 11, wherein the bottom layer or the top layer or the bottom layer and the top layer additionally comprises a catalytically active PGM component.

13. A method for treating a diesel exhaust gas stream, the method comprising the steps of: i) providing a diesel oxidation catalyst comprising: (a) a carrier substrate; (b) a bottom layer coated on said carrier substrate comprising at least one microporous material; (c) a middle layer coated over said bottom layer comprising at least one catalytically active PGM component; (d) a top layer coated over said middle layer comprising at least one microporous material; and (ii) contacting said diesel exhaust gas stream with said diesel oxidation catalyst for the treatment of exhaust gas emissions.

14. The method of embodiment 13, wherein the middle layer of the diesel oxidation catalyst is substantially free of a microporous material.

Other specific designs can be used alone or in combination with the layered diesel oxidation catalyst composites according to the present invention as follows:

the precious metal component comprises Pt, Pd, or both;

the refractory metal oxide support of the middle layer comprises a compound that is activated, stabilized, or both selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania;

the first molecular sieve, the second molecular sieve, or both each independently has a pore size from 0.3 to 1.0 nm;

the first molecular sieve, the second molecular sieve, or both each independently comprises a zeolite;

the bottom layer, the top layer, or both each independently further comprises a refractory metal oxide support;

the bottom layer, the top layer, or both additionally comprises a precious metal component;

the bottom layer comprises a first zeolite, activated gamma-alumina, and a platinum component; the middle layer comprises activated gamma alumina, a platinum component, and a palladium component, and is substantially free of a zeolite; and the top layer comprises a second zeolite, activated gamma-alumina, and a platinum component;

the bottom layer and the top layer are both substantially free of palladium.

the activated gamma alumina of the middle layer has a surface area in the range of 80 to 200 m$^2$/g, a pore volume in the range of 0.6 to 1.0 cm$^3$/g, and an average pore diameter in the range of 70 Å to 150 Å, and wherein the first zeolite and the second zeolite both comprise a beta zeolite;

a total precious metal component loading in an amount in the range of 15 to 225 g/ft$^3$ (0.53 to 7.95 kg/m$^3$);

The present invention is further illustrated by way of the following examples.

EXAMPLES

1. Catalyst Preparation

For the 1st (bottom) layer a washcoat slurry was prepared containing 1 g/in$^3$ of a gamma alumina, 0.5 g/in3 H-beta zeolite, and a platinum precursor solution preferably with platinum as an ammine stabilized Pt complex added to give a content of 5 g/ft$^3$ Platinum. The slurry was milled to a particle size d90 of 15 μm and subsequently coated onto a monolith, dried at 110° C. air and calcined at 450° C. in air.

For the 2$^{nd}$ (middle) layer a washcoat slurry was prepared containing 1.5 g/in$^3$ of a high porous gamma alumina, Palladium nitrate, and Platinum as an ammine stabilized Pt complex added to give a dry content of Pt and Pd in a 1.75:1 weight ratio (70 g/ft$^3$ Pt and 40 g/ft$^3$ Pd). After milling the slurry was then subsequently coated onto the 1$^{st}$ layer, dried at 110° C. air and calcined at 450° C. in air.

For the 3$^{rd}$ (top) layer a washcoat slurry was prepared using the same procedure followed as for the 1$^{st}$ layer with decreased amounts of alumina (0.35 g/in$^3$), a H-beta zeolite loading of 0.5 g/in$^3$ and Pt to give 5/ft$^3$. This slurry was coated onto the 2$^{nd}$ layer, dried at 110° C. and calcined at 450° C. in air.

2. Comparison of State of the Art Catalyst Technologies with Invention Technology Test Samples:

2.1 Sample 1 COMPARATIVE: A three layer catalyst was tested comprising:
layer 1: 1.0 g/in$^3$ alumina,
layer 2: 1.5 g/in$^3$ alumina and 112 g/ft$^3$ Pt/Pd 1.8/1,
layer 3: 0.2 g/in$^3$ alumina, 0.5 g/in$^3$ H-beta zeolite, 8 g/ft$^3$ Pt. The alumina had a single point adsorption total pore volume in the range of about 0.85 cm$^3$/g and an average BET pore diameter of about 100 Å.

2.2 Sample 2 COMPARATIVE: A two layer catalyst was tested comprising:
layer 1: 1.0 g/in$^3$ alumina, 0.5 g/in$^3$ H-beta zeolite
layer 2: 0.5 g/in$^3$ H-beta zeolite, 1.3 g/in$^3$ alumina, 120 g/ft$^3$ Pt/Pd 2/1

2.3 Sample 3: A three layer catalyst was tested comprising:
layer 1: 1.0 g/in$^3$ alumina, 0.5 g/in$^3$ H-beta zeolite, 5 g/ft$^3$ Pt,
layer 2: 1.5 g/in$^3$ alumina and 110 g/ft$^3$ Pt/Pd 1.75/1, The alumina had a single point adsorption total pore volume in the range of about 0.85 cm$^3$/g and an average BET pore diameter of about 100 Å
layer 3: 0.35 g/in$^3$ alumina, 0.5 g/in$^3$ H-beta zeolite, 5 g/ft$^3$ Pt Test Procedure:

All samples were aged on a 4-cylinder light duty diesel engine with 2.7 L engine displacement for 25 hrs at a constant temperature of 650° C. Catalysts were then evaluated for their light off activity on a 2.0 L 4-cylinder diesel engine. For this light-off test each catalyst was heated for 6 min at 350° C. to clean the catalyst surface of HC. Then the catalyst was preconditioned at low temperature (130° C.) to expose the catalyst to 6 g of total HC prior to increasing the temperature from 130° C. to 380° C. within 20 min. Conversion was calculated as ratio between the converted hydrocarbon concentration and the DOC inlet concentration.

Results are shown in Table 1 (FIG. 1) for hydrocarbon conversion (in %, y-axis) as a function of inlet temperature (in ° C., x-axis).

TABLE 1

|  | HC, T$_{70}$ ° C. | CO, T$_{50}$ ° C. |
|---|---|---|
| Sample 1 COMPARATIVE | Refer to FIG. 1 | Refer to FIG. 1 |
| Sample 2 COMPARATIVE | Refer to FIG. 1 | Refer to FIG. 1 |
| Sample 3 | Refer to FIG. 1 | Refer to FIG. 1 |

The results in Table 1 (FIG. 1) clearly demonstrate that sample 3 exhibits improved hydrocarbon storage activity as well as a very good conversion activity compared to the other two samples.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A layered diesel oxidation catalyst composite for the treatment of exhaust gas emissions from a diesel engine comprising:
   (a) a carrier substrate;
   (b) a bottom layer coated on said carrier substrate comprising at least one first molecular sieve;
   (c) a middle layer coated over said bottom layer comprising at least one precious metal component on a refractory metal oxide support and being substantially free of a molecular sieve; and
   (d) a top layer coated over said middle layer comprising at least one second molecular sieve.

2. The layered diesel oxidation catalyst composite of claim 1, wherein the precious metal component comprises Pt, Pd, or both.

3. The layered diesel oxidation catalyst composite of claim 1, wherein the refractory metal oxide support of the middle layer comprises a compound that is activated, stabilized, or both selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

4. The layered diesel oxidation catalyst composite of claim 1, wherein the first molecular sieve, the second molecular sieve, or both each independently has a pore size from 0.3 to 1.0 nm.

5. The layered diesel oxidation catalyst composite of claim 1, wherein the first molecular sieve, the second molecular sieve, or both each independently comprises a zeolite.

6. The layered diesel oxidation catalyst composite of claim 1, wherein the bottom layer, the top layer, or both each independently further comprises a refractory metal oxide support.

7. The layered diesel oxidation catalyst composite of claim 1, wherein the bottom layer, the top layer, or both additionally comprises a precious metal component.

8. The layered diesel oxidation catalyst composite of claim 1, wherein:
the bottom layer comprises a first zeolite, activated gamma-alumina, and a platinum component;
the middle layer comprises activated gamma alumina, a platinum component, and a palladium component, and is substantially free of a zeolite; and
the top layer comprises a second zeolite, activated gamma-alumina, and a platinum component.

9. The layered diesel oxidation catalyst composite of claim 8, wherein the bottom layer and the top layer are both substantially free of palladium.

10. The layered diesel oxidation catalyst composite of claim 8, wherein the activated gamma alumina of the middle layer has a surface area in the range of 80 to 200 $m^2/g$, a pore volume in the range of 0.6 to 1.0 $cm^3/g$, and an average pore diameter in the range of 70 Å to 150 Å, and wherein the first zeolite and the second zeolite both comprise a beta zeolite.

11. The layered diesel oxidation catalyst composite of claim 1 having a total precious metal component loading in an amount in the range of 15 to 225 $g/ft^3$ (0.53 to 7.95 $kg/m^3$).

12. A method of treating a gaseous exhaust stream of a diesel engine, the exhaust stream including hydrocarbons, carbon monoxide, and other exhaust gas components, the method comprising: contacting the exhaust stream with the layered diesel oxidation catalyst composites of claim 1.

13. The method of claim 12, wherein the catalytic material further comprises the palladium component in an amount in the range of 5 to 75 $g/ft^3$ (0.18 to 2.65 $kg/m^3$) and a platinum component, in the range from 10 $g/ft^3$ to 150 $g/ft^3$ (0.35 to 5.30 $kg/m^3$), an amount of up to 10% by weight of the platinum component being incorporated into the at least one molecular sieve, and an amount of at least 90% by weight of the platinum component being on the high surface area, refractory metal oxide support of the palladium-containing layer.

14. The method of claim 13, further comprising directing the diesel exhaust gas stream one or more to a soot filter located downstream of the diesel oxidation catalyst composite and a selective catalytic reduction (SCR) catalytic article located upstream or downstream of the catalyzed soot filter (CSF).

15. A system for treatment of a diesel engine exhaust stream including hydrocarbons, carbon monoxide, and other exhaust gas components, the emission treatment system comprising:
an exhaust conduit in fluid communication with the diesel engine via an exhaust manifold;
the diesel oxidation catalyst composite of claim 1 wherein the carrier is a flow through substrate or a wall-flow substrate; and
one or more of the following in fluid communication with the composite: a soot filter, a selective catalytic reduction (SCR) catalytic article and a NOx storage and reduction (NSR) catalytic article.

* * * * *